United States Patent [19]
Kanno

[11] Patent Number: 5,582,149
[45] Date of Patent: Dec. 10, 1996

[54] IGNITION TIMING CONTROL FOR ENGINE

[75] Inventor: Isao Kanno, Hamamatsu, Japan

[73] Assignee: Sanshin Kogyo Kabushiki Kaisha, Hamamatsu, Japan

[21] Appl. No.: 502,214

[22] Filed: Jul. 13, 1995

[30] Foreign Application Priority Data

Jul. 13, 1994 [JP] Japan .................................. 6-161233

[51] Int. Cl.⁶ ................................................ F02P 5/02
[52] U.S. Cl. ................................................ 123/413
[58] Field of Search .................................... 123/329, 413, 123/418, 422, 423

[56] References Cited

U.S. PATENT DOCUMENTS

| | | | |
|---|---|---|---|
| 4,606,314 | 8/1986 | Yamazaki | 123/413 |
| 4,612,899 | 9/1986 | Honjoh et al. | 123/413 |
| 4,844,034 | 7/1989 | Honjo et al. | 123/413 |
| 4,901,696 | 2/1990 | Sakamoto et al. | 123/413 |
| 4,986,239 | 1/1991 | Oishi | 123/413 |
| 5,159,916 | 11/1992 | Isogawa | 123/413 |

*Primary Examiner*—Willis R. Wolfe
*Attorney, Agent, or Firm*—Knobbe, Martens, Olson & Bear

[57] ABSTRACT

A spark timing control arrangement for an internal combustion engine that employs a manually operated spark timing control in response to operator demand and an electronically controlled spark timing in response to engine speed, thus permitting adjustment in response to a variety of engine parameters without requiring large computer capabilities.

14 Claims, 6 Drawing Sheets

IGNITION TIMING CONTROL FOR ENGINE

BACKGROUND OF THE INVENTION

This invention relates to an ignition timing control for an engine and more particularly to a simplified yet highly effective arrangement for controlling the spark timing of an internal combustion engine.

As is well known, the optimum spark timing curve for an engine is dependent upon a number of factors, primarily engine speed and engine load. A wide variety of mechanical type of devices have been proposed for use with engines and wherein the spark advance can be controlled in response to more than one engine variable. These mechanical systems tend to become rather complicated and cumbersome and are not always as responsive to change in conditions as is desired.

On the other hand, there have been proposed ignition timing controls that are primarily electronic in nature and wherein sensors sense certain engine conditions and output signals indicative of those conditions to an ECU. The ECU is programmed with internal maps and selects the appropriate spark timing from the input parameters and controls the ignition so as to provide the desired timing. Although these systems are quite effective, they tend to be rather complicated. In addition, having a variety of parameters requires a rather large memory capacity.

It is, therefore, a principal object of this invention to provide an improved and simplified ignition timing control for an engine.

It is a further object of this invention to provide a simplified ignition timing control for an engine wherein the timing can be adjusted to be appropriate for all engine conditions without requiring large computer capacities.

In addition to the aforenoted problems in connection with providing optimum spark timing, it has also been recognized that in certain types of engine applications, particularly for use with outboard monors, the actual running conditions and optimum spark timing may vary from cylinder to cylinder depending upon the orientation of the cylinders. This is primarily a function of the fact that in two-cycle engines, the type normally used in outboard motor practice, the interrelationship between the length of the distance between the engine exhaust ports and the discharge point of the exhaust pipe varies from cylinder to cylinder because of the very nature of an outboard motor. These variations require different spark timings for at least some of the cylinders. Obviously, with a purely mechanical system this cannot be accomplished. Furthermore, with electronic systems and in view of the fact that these variations are not linear with either engine speed or engine load, the capability of the memory of the computer is further taxed.

It is, therefore, a still further object of this invention to provide an improved and simplified spark advance system for a multi-cylinder engine wherein the spark timing for different cylinders can be controlled differently.

SUMMARY OF THE INVENTION

This invention is adapted to be embodied in an ignition timing control for an internal combustion engine having an output shaft. A sensor is mounted in proximity to the engine output shaft and senses the angle of the output shaft to provide a signal to a control circuit for the spark plug indicative of crankshaft angle. Means are provided for controlling the position of the sensor relative to the output shaft in response to operator demand for varying the timing signal in response to operator demand. A sensor is provided for sensing another engine condition and outputting a signal of that engine condition. The ignition control incorporates a map that is plotted in accordance with the other condition and the operator demand so as to adjust the spark timing in response to these inputs.

DETAILED DESCRIPTION OF THE PREFERRED EMBODIMENTS OF THE INVENTION

Figure 1:
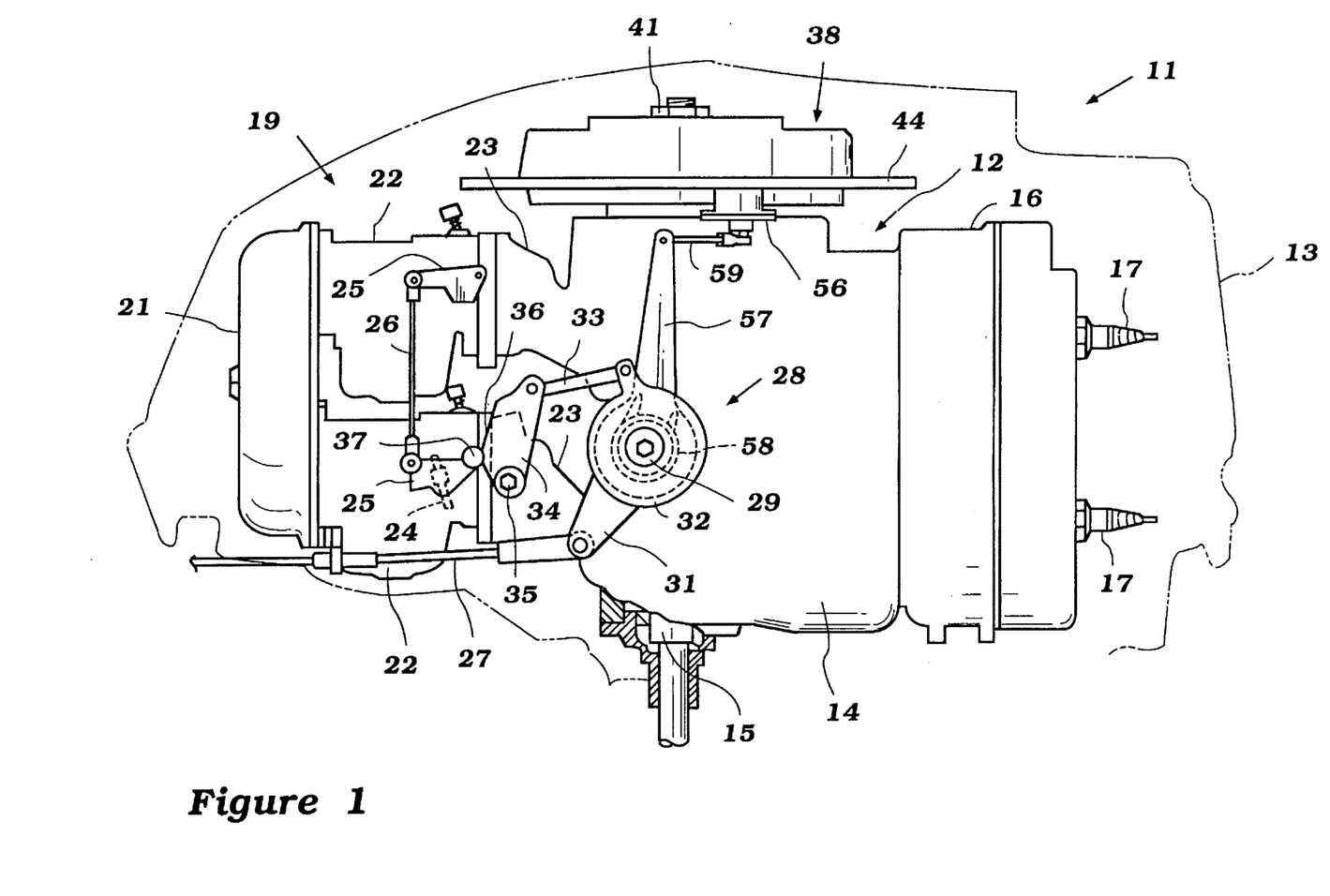
FIG. 1 is a side elevational view of the power head of an outboard motor constructed in accordance with an embodiment of the invention, with portions broken away and with the protective cowling being shown in phantom.
Figure 2:
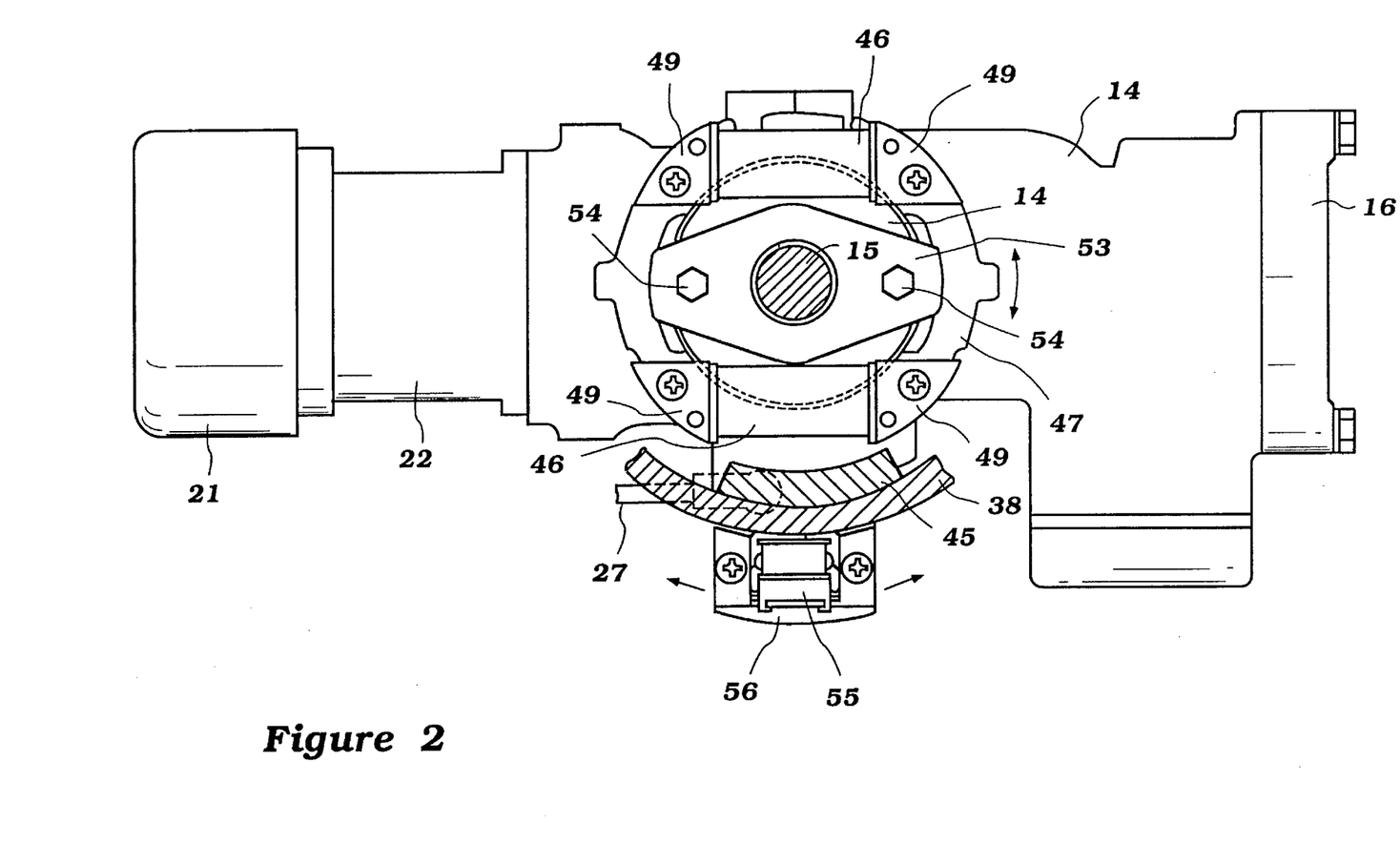
FIG. 2 is an enlarged top plan view of the engine of the outboard motor shown in FIG. 1, with a portion of the flywheel magneto broken away and parts thereof shown in section.

Referring now in detail to the drawings and initially to FIGS. 1 and 2, a portion of an outboard motor is shown partially and with components thereof in phantom, and is identified generally by the reference numeral 11. Actually, the only portion of the outboard motor 11 that is depicted is the power head which is comprised of an internal combustion engine, indicated generally by the reference numeral 12 and the surrounding protective cowling, shown in phantom only in FIG. 1 and identified by the reference numeral 13.

It is to be understood that the invention is described in conjunction with an outboard motor because the invention has particular utility in conjunction with outboard motors. The reason for this is two-fold. First, certain facets of the invention have particular utility with two-cycle internal combustion engines and such engines are frequently used as the propulsion source for an outboard motor. Second, the invention has additional utility in conjunction with engines wherein the spark timing for the various cylinders of the engine under optimum conditions is not the same, and this condition is common with outboard motor applications, for the reasons already noted.

Thus, although the invention has particular utility in conjunction with two-cycle engines and outboard motors, it will be apparent to those skilled in the art that the application for the invention is not so limited. That is, the invention may be employed in conjunction with various other applications for two-cycle engines and may be applied with engines operating on the four-stroke principle under a wide variety of applications. Also and although the invention has added advantages with multi-cylinder engines, it may be also employed with single cylinder engines or engines having other configurations than that illustrated.

The engine 12 is comprised of a cylinder block 14 which, in the illustrated embodiment, is formed with two cylinder bores that are formed in any manner well known in this art.

As has been previously noted, the engine 12 in this particular embodiment is of the in-line type and in accordance with conventional outboard motor practice, this means that the cylinder bores and the cylinder block 14 are disposed one vertically above the other. Since the internal construction of the engine forms no part of the invention, it will not be described in any detail, and thus where components are not described or illustrated, they may be considered to be conventional.

As is well known in outboard motor practice and because of the vertical positioning of the cylinder bores, the pistons in them drive a crankshaft 15 which rotates about a vertically extending axis. This orientation facilities attachment of the crankshaft 15 to a driveshaft (not shown) that depends from the power head of the outboard motor 11 and drives a propulsion device in the lower unit thereof in a well known manner.

A cylinder head 16 is affixed to the cylinder block 14 in a known manner. This cylinder head 16 defines individual recesses which cooperate with the cylinder bores and the pistons therein to form the combustion chambers of the engine. Spark plugs 17 are mounted in the cylinder head 16 and have their spark gaps extending into the recesses for firing the charge therein. The spark plugs 17 are fired by an ignition circuit which will be described later.

In typical two-cycle crankcase compression internal combustion engine practice, the crankshaft 15 rotates in a crankcase chamber, formed in part by the cylinder block 14 and by a crankcase member 18 that is affixed thereto in a known manner. The crankcase chambers associated with each of the cylinders are sealed relative to each other in an appropriate manner. A charge is delivered thereto by an induction system indicated generally by the reference numeral 19.

The induction system 19 includes an air inlet device 21 which gathers air from within the protective cowling 13 and delivers it to a pair of charge formers, in the illustrated embodiment carburetors 22. Although the invention is described in conjunction with a carbureted engine, it will be readily apparent to those skilled in the art how the invention can be applied with engines having fuel injection or other types of charge forming systems.

The carburetors 22 form a fuel air mixture which is delivered to the individual crankcase chambers, aforenoted, through intake manifolds 23. Check valves (not shown) are provided at the ends of the intake manifolds 23 so that the charge may be drawn into the crankcase chambers and compressed therein without effecting reverse flow. Again, this type of construction is well known in the art and a further description of it is not believed to be necessary to permit those skilled in the art to practice the invention.

Each carburetor 22 is provided with a flow controlling throttle valve, one of which is shown in phantom in FIG. 1 and is identified by the reference numeral 24. The throttle valves 24 are affixed to individual throttle valve shafts to which throttle links 25 are connected. The throttle links 25 of the carburetors 22 are connected to each other by a further link 26 so as to synchronize their operation.

A bowden wire engine control, indicated by the reference numeral 27, extends from a remotely positioned operator into the protective cowling 23 for operating a throttle and spark control mechanism. This control mechanism is indicated generally by the reference numeral 28 mounted on the side of the cylinder block 14 by means of a pivot bolt 29. The bowden wire actuator 27 is connected to a control lever 31 of this control mechanism 28 and which control lever 31 forms a part of a first control member 32 which is journaled on the pivot bowl 29. A link 33 connects this control member 32 to a throttle actuating cam 34 that is pivotally journaled on the lower intake manifold 23 by a pivot bolt 35. A cam surface 36 is formed on the throttle cam 34 and cooperates with a follower 37 on the lower throttle lever 35 for opening and closing the throttle valve 24 in response to movement of the wire actuator 27. This movement is generally linear.

Figure 3:
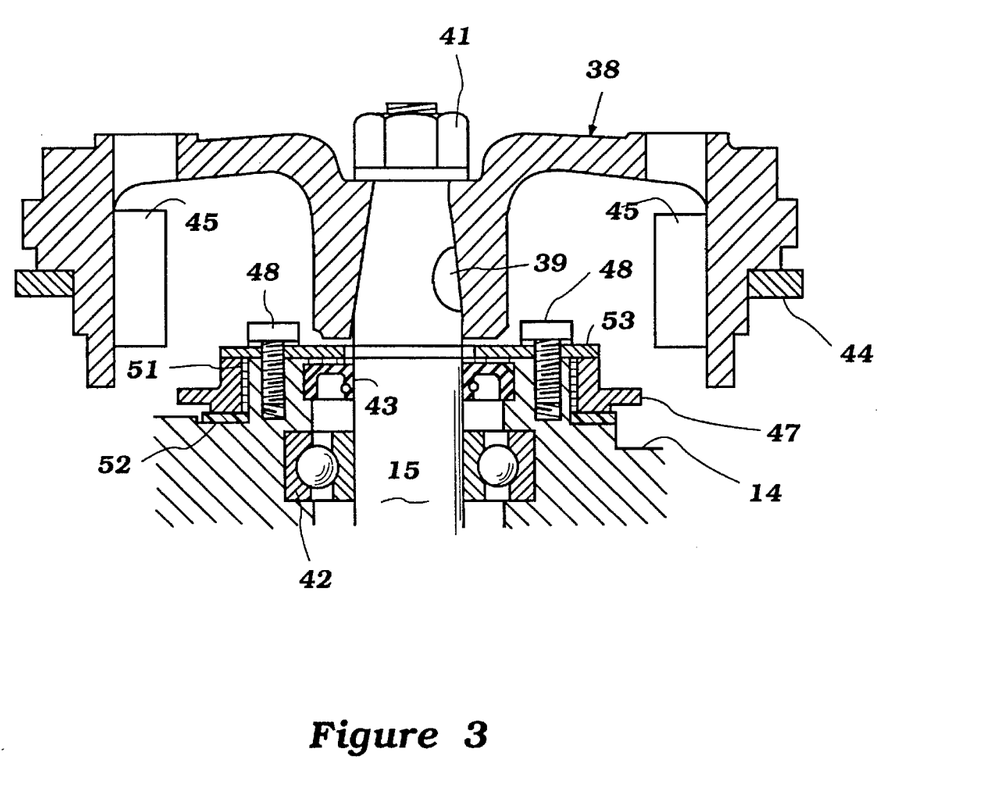
FIG. 3 is an enlarged cross-sectional view taken through the flywheel magneto and timing arrangement.

The ignition system for the engine 12 will now be described by primary reference initially to FIGS. 1–3. This ignition system includes a flywheel magneto assembly, indicated generally by the reference numeral 38 and which is affixed to the upper end of the crankshaft 14 by means of a key 39 and nut 41. The flywheel magneto assembly 38 is disposed above an upper main bearing 41 carried at the upper end of the cylinder block 14 and below a seal 43. This assembly also rotatably journals, in part, the crankshaft 15 and also provides a portion of the seal for the crankcase chambers, as aforenoted.

The flywheel magneto assembly 38 carries a peripheral ring gear 44 that may be engaged by a pinion gear (not shown) of a starter motor for electric starting of the engine 12 in any well known manner.

The interior of the flywheel magneto 38 carried a series of circumferentially segmented permanent magnets 45. These permanent magnets 45 cooperate with charging coils 46 that are affixed to a timing plate 47 of the flywheel magneto assembly 38. The timing plate 47 is held in fixed axial relationship to the cylinder block 14 by threaded fasteners 48 and a retainer plate 53 which are disposed radially outwardly of the seal 43 and in proximity to the main bearing 42. The coils 46 have end portions 49 carried by the retainer plate 47. These coils 46 are connected to a suitable ignition circuit for charging, for example, a capacitor if a capacitor discharge ignition circuit is employed. In addition, the charging coils 46 may be employed for providing electrical power to charge a battery and/or to power various accessories of the engine 12 and the watercraft with which it is associated. As is well known, rotation of the flywheel and the magnets 45 will induce a current in the coils 46 for this purpose.

The timing plate 47 is journaled for rotation on a bushing 51 which encircles a pilot portion of the cylinder block 14. A lower anti-friction member 52 supports the lower portion of the timing plate 47. The retainer plate 53 has an opening through which the crankshaft 15 extends as clearly shown in FIG. 2.

The timing plate 47 further carries a pulsar coil 55 on an extension 56 thereof. The pulsar coil 55 outputs a signal to an ignition circuit, to be described, which indicates the angular position of the crankshaft 15 so as to provide the appropriate spark timing control.

The angular position of the pulsar coil 55 and timer plate 47 is controlled so as to provide a mechanical adjustment of spark timing. This operation is also controlled by the control mechanism 28 and will now be described again by primary reference to FIG. 1. A spark timing lever 57 is journaled on the pivot bolt 29 and is spring-biased by a torsional spring 58 for movement with the control lever 31 under some conditions. There is also provided, however, a form of lost motion connection so that some portions of the movement of the throttle valves 25 may be accomplished without any change in the mechanical spark timing. Thus, some form of lost motion connection, as is well known in this art, is interposed between the lever 31 and the spark control lever 57. The upper end of the spark control lever 57 is connected to the arm 56 of the timing plate 47 by means of a pivoted link 59.

To return to the description of the manual or mechanically operated spark advance, the lost motion connection and torsional spring 58 may be operative so as to permit some initial opening of the throttle valves 24 before the timing plate 47 is actually rotated. After this initial time delay, the rate of pivotal movement of the timing plate 47 relative to the opening of the throttle valves 24 may be linear or on a non-linear basis. In addition, the maximum spark timing advance achieved by the timing plate 47 may be reached before the throttle valves 24 reach they fully opened position. This maximum advance may be held or, alternatively, may be retarded somewhat upon further throttle opening.

Figure 5:
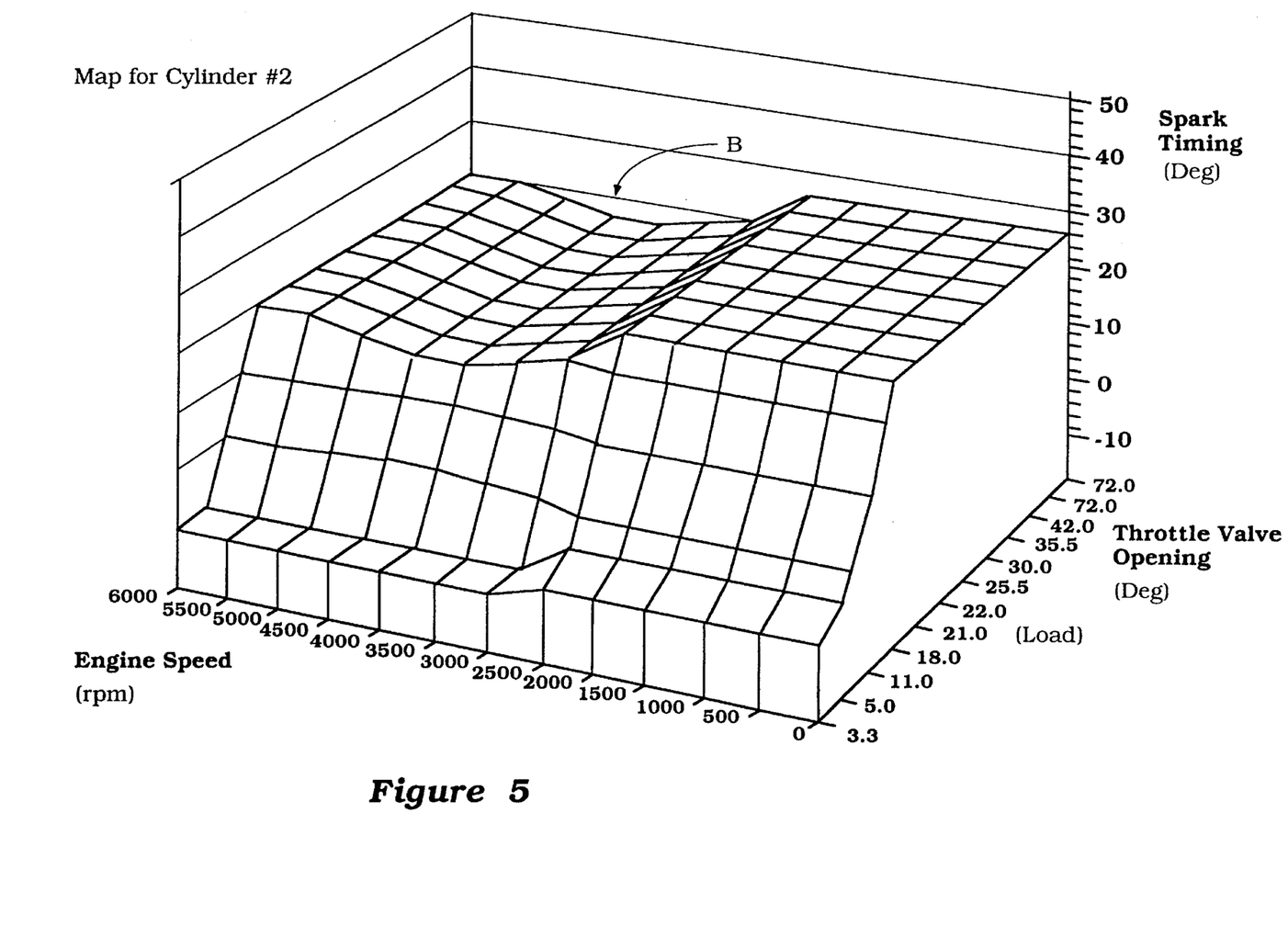
FIGS. 5 and 6 are graphical views showing the maps of spark timing relative to engine speed and throttle opening for cylinder numbers 2 and 1 of the engine.
Figure 6:
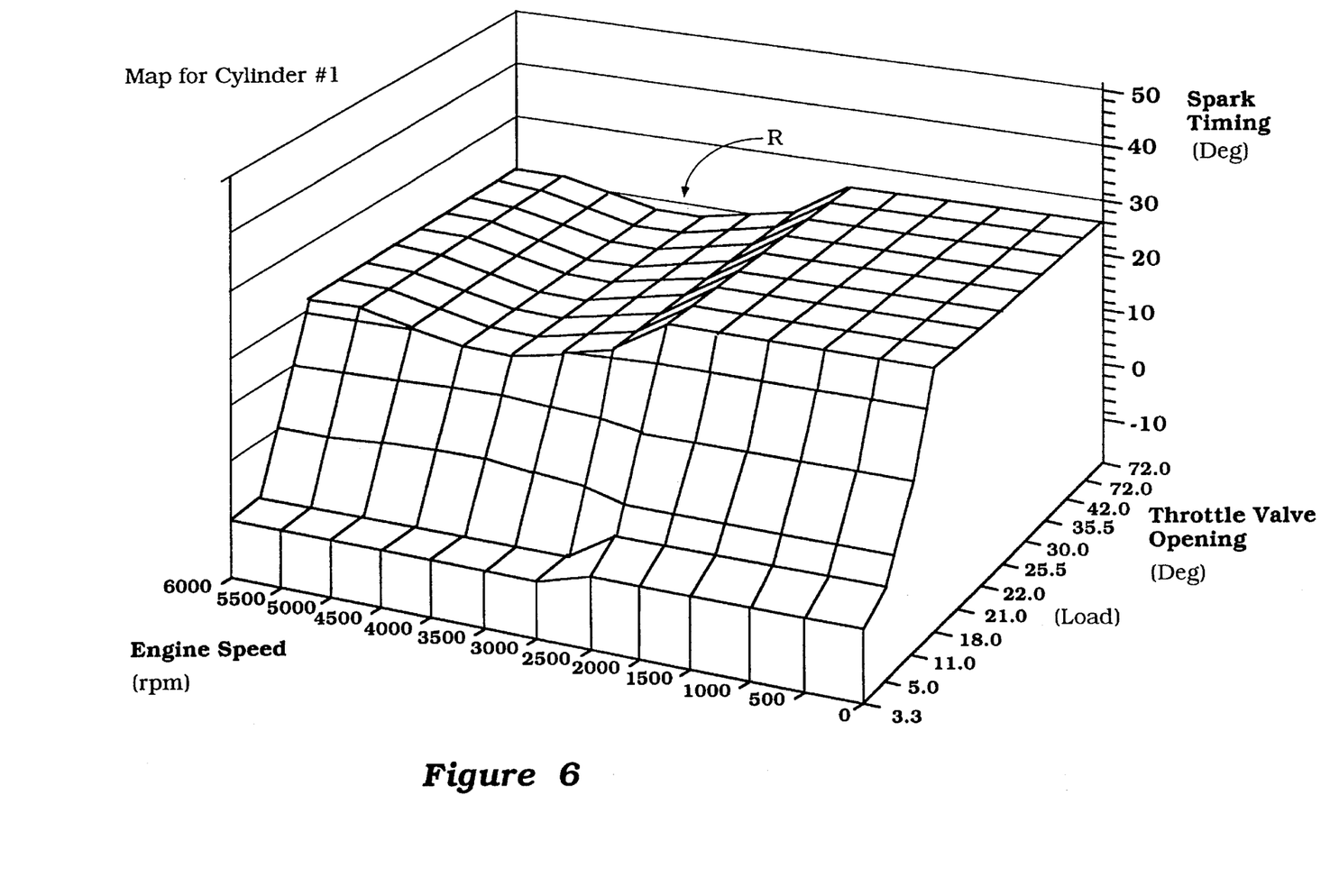

The actual spark timing in response to the throttle position, i.e., load, can vary and, as will be described by particular reference to FIGS. 5 and 6, the concept basically operates on a principle wherein the spark timing is held at a fixed advance for a certain degree of throttle opening, then is advanced in response to opening of the throttle valve, and then is held constant in a predetermined throttle opening. However, as will be also described, this basic configuration is changed in response to another engine condition, as will now be described.

It should be understood that the mechanical spark advance mechanism as thus far described may be considered to be conventional and any known type of mechanical spark advance may be employed. In accordance with the invention, this mechanical spark advance is adjusted and varied in response to another engine running parameter, in this case actual engine speed. The way this is done may be understood by reference to FIG. 4 which is a schematic block diagram and shows the interrelationship of the various components of the system.

Figure 4:
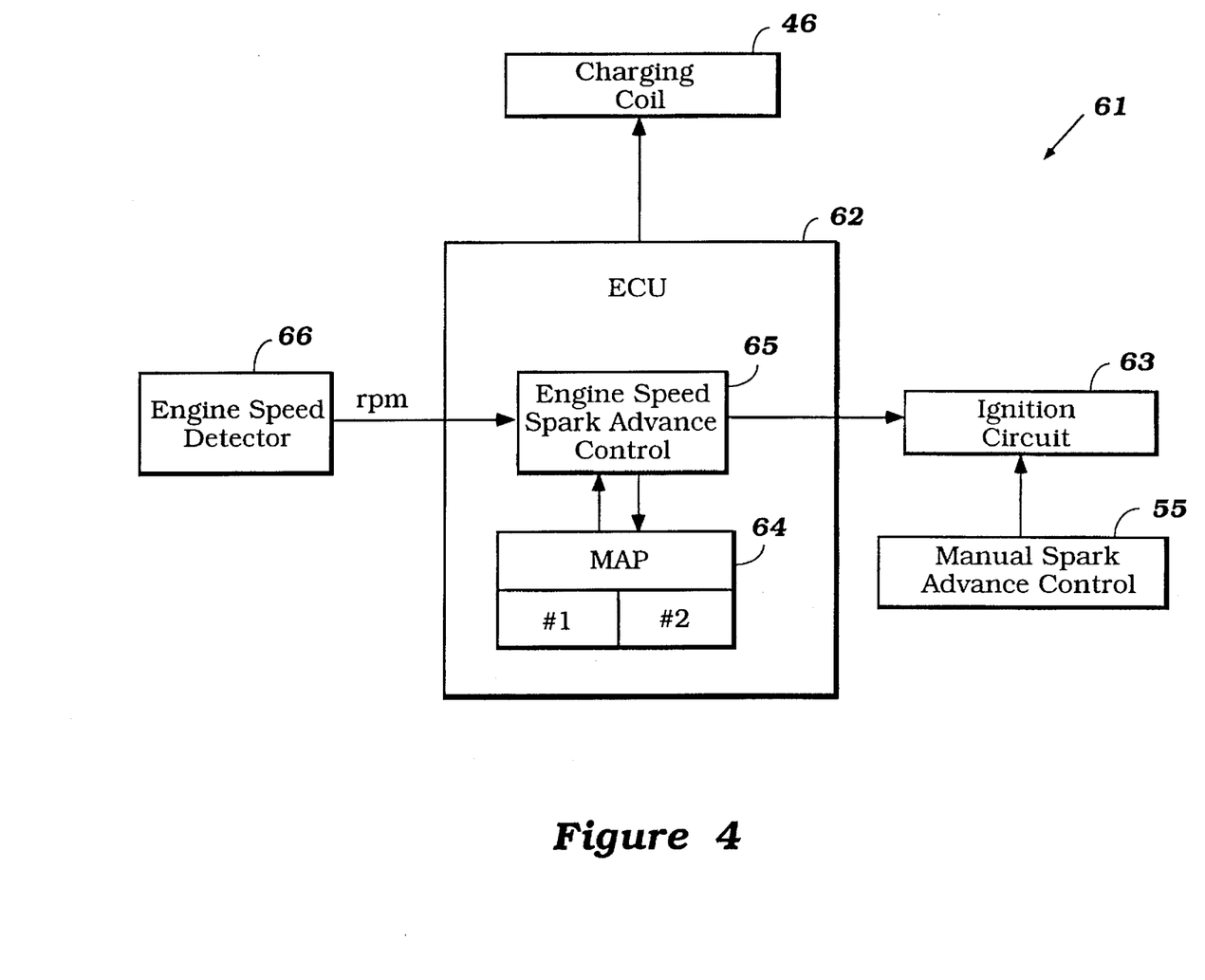
FIG. 4 is a schematic block diagram showing the interrelationship of the components of the spark advance control system.

In this figure, the spark control system is indicated generally by the reference numeral 61 and includes an ECU control unit, indicated generally by the reference numeral 62, which provides an output signal to the ignition circuit, indicated generally by the reference numeral 63. As has been previously noted, the pulsar coil 55 also outputs a signal to this circuit and the timing of this signal will depend upon the angular position of the timing plate 47 as aforenoted. The ECU is also preprogrammed with a map, indicated schematically at 64, which actually is comprised of a pair of maps (#1 and #2), one for each cylinder of the engine.

This information is exchanged with an engine speed advance control circuit 65 which also receives and transmits to the map 64 data regarding the actual engine speed as indicate by an engine speed detector 66. This engine speed detector may either process the signals from the pulsar coil 55 or signals from a crank angle position sensor that is fixed so as to provide an indication of engine speed by counting the number of pulses in a given time interval.

In the arrangement shown in FIG. 4, the spark advance control 65 outputs its signal directly to the ignition circuit 63 and the timing is modified in accordance with the maps by the engine speed spark advance control 65. It should be readily apparent that the manual spark advance control may also be inputted to the ECU rather than directly to the ignition circuit. However, the described construction permits a simpler arrangement and reduces the number of maps required.

As has been noted, the vertical placement of the cylinders and the type of exhaust system employed with outboard motors gives rise to a situation wherein the optimum spark advance for the cylinders varies from each other. That is, the exhaust ports of the engine communicate with an exhaust manifold which will be formed within the cylinder block 14 and which discharges through the lower end of the cylinder block to an exhaust pipe that depends into the driveshaft housing. This structure is not shown but is well known in the art. Hence, the uppermost or number 1 cylinder will be further from the discharge point of the exhaust pipe than the lower-most or number 2 cylinder. The pulse back affects on the engine thus vary and the optimum spark timing for each cylinder is not the same, as may be seen in FIGS. 5 and 6. Thus, separate maps A and B are utilized for cylinder numbers 1 and 2, respectively.

As may be seen from these figures, the engine speed in accordance with the illustrated embodiment, has no significant effect on optimum spark timing in the range of up to about 2,500 rpm. Hence, under this condition, the spark timing is generally held constant up until a relatively low throttle opening, then is increased gradually up until the throttle is open at about 11° and then increases more rapidly up until a point of about 25° or 30° of throttle opening at which it is held constant.

However, when the engine speed exceeds a predetermined speed such as 2,500 rpm in the illustrated embodiments, then the optimum spark timing actually is retarded from that set purely by the load condition and this is possible through the electronic adjustment. This retardation decreases in the range of about 2,500 rpm to about 4,000 rpm and then the degree of retardation is reduced, with the amount of change varying depending upon the cylinder location.

Thus, it should be apparent that the described construction permits the use of a relatively simple spark advance mechanism that can accommodate both changes in engine speed and engine load without requiring an ECU with a large memory capacity. Of course, the foregoing description is that of a preferred embodiment of the invention and various changes and modifications-may be made without departing from the spirit and scope of the invention, as defined by the appended claims. Of course, the foregoing description is that of preferred embodiments of the invention, and various changes and modifications may be made without departing from the spirit and scope of the invention, as defined by the appended claims.

I claim:

1. A spark timing control for an internal combustion engine comprising a manually operated operator speed control, a mechanical spark timing mechanism including a pulser coil mounted in proximity to the engine output shaft coupled to said manually operated control for moving said pulser coil for providing a control signal for varying the spark timing in response to operator demand, engine sensor means for sensing another engine condition and outputting a signal indicative of that other engine condition, a spark control circuit for receiving signals from said engine condition sensor and said operator demand and providing a spark timing signal in response to such signals.

2. A spark timing control as in claim 1, wherein the engine condition sensor senses engine speed.

3. A spark timing control as in claim 2, wherein the spark control includes a map indicating spark timing adjustment in response to engine speed for a given operator demand.

4. A spark timing control for an internal combustion engine having at least two cylinders and two spark plugs comprising a manually operated operator speed control, a mechanical spark timing mechanism coupled to said manually operated control for providing a control signal for varying the spark timing in response to operator demand, engine sensor means for sensing another engine condition and outputting a signal indicative of that other engine condition, a spark control circuit for receiving signals from said engine condition sensor and said operator demand and providing a spark timing signal in response to such signals, the timing of firing of the spark plugs for each cylinder being varied independently of the other in response to the sensed other engine condition.

5. A spark timing control as in claim 4, wherein the manual spark timing signal is provided by a pulser coil mounted in proximity to the engine output shaft and movable in response to movement of the operator control.

6. A spark timing control as in claim 5, wherein the engine condition sensor senses engine speed.

7. A spark timing control as in claim 6, wherein the spark control includes a map indicating spark timing adjustment in response to engine speed for a given operator demand.

8. A spark timing control method for an internal combustion engine comprising a manually operated operator speed control, a mechanical spark timing mechanism including a pulser coil mounted in proximity to the engine output shaft and coupled to said manually operated control for providing a control signal for varying the spark timing in response to operator demand, said method comprising the steps of sensing another engine condition and varying the output of said mechanical spark timing in response to such signals.

9. A spark timing control method as in claim 8, wherein the engine condition sensed is engine speed.

10. A spark timing control method as in claim 9, wherein a map indicates spark timing adjustment in response to engine speed for a given operator demand.

11. A spark timing control method for an internal combustion engine having at least two cylinders and two spark plugs comprising a manually operated operator speed control, a mechanical spark timing mechanism coupled to said manually operated control for providing a control signal for varying the spark timing in response to operator demand, said method comprising the steps of sensing another engine condition and varying the output of said mechanical spark timing in response to such signals, the timing of firing of the spark plugs for each cylinder being varied independently of the other in response to the sensed other engine condition.

12. A spark timing control method as in claim 11, wherein the manual spark timing signal is provided by a pulser coil mounted in proximity to the engine output shaft and movable in response to movement of the operator control.

13. A spark timing control method as in claim 12, wherein the sensed engine condition is engine speed.

14. A spark timing control method as in claim 13, wherein a map indicates spark timing adjustment in response to engine speed for a given operator demand.

* * * * *